United States Patent
Park et al.

(10) Patent No.: US 7,254,376 B2
(45) Date of Patent: Aug. 7, 2007

(54) WEARABLE PHONE AND METHOD OF USING THE SAME

(75) Inventors: Tae-suh Park, Gyeonggi-do (KR); Sang-goog Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 379 days.

(21) Appl. No.: 10/876,616

(22) Filed: Jun. 28, 2004

(65) Prior Publication Data
US 2005/0009584 A1    Jan. 13, 2005

(30) Foreign Application Priority Data
Jun. 27, 2003    (KR)    ............ 10-2003-0042774

(51) Int. Cl.
*H04M 11/00*    (2006.01)
(52) U.S. Cl. ............ 455/100; 455/569.1; 455/575.1; 345/156; 345/157; 341/20; 341/22
(58) Field of Classification Search ............ 455/567, 455/100, 575.1, 569.1; 345/156, 157, 158, 345/160; 341/20–22
See application file for complete search history.

(56) References Cited
U.S. PATENT DOCUMENTS

| | | | | |
|---|---|---|---|---|
| 5,901,222 A | * | 5/1999 | Macor | ............ 379/433.04 |
| 6,044,153 A | * | 3/2000 | Kaschke | ............ 379/433.01 |
| 6,452,584 B1 | * | 9/2002 | Walker et al. | ............ 345/158 |
| 2002/0080031 A1 | * | 6/2002 | Mann et al. | ............ 340/572.1 |
| 2003/0214408 A1 | * | 11/2003 | Grajales | ............ 340/573.1 |
| 2004/0034505 A1 | * | 2/2004 | Kimble | ............ 702/182 |
| 2004/0095311 A1 | * | 5/2004 | Tarlton et al. | ............ 345/156 |

* cited by examiner

Primary Examiner—Matthew Anderson
Assistant Examiner—Tuan Pham
(74) Attorney, Agent, or Firm—Sughrue Mion, PLLC

(57) ABSTRACT

A wearable phone and a method of using the same is provided. The phone includes a glove; a display mounted on the glove and including a user interface, the display on which a virtual key pad is displayed; a sensor on the glove disposed under the display, the sensor for sensing the movement of the entire hand; sensors on the glove disposed at interfaces between the fingers and the back of the hand, the sensors for sensing the movements of the fingers; a speaker on the glove disposed under the root of the little finger; a microphone spaced apart from the speaker by a predetermined distance below the speaker; a wireless communication module on the glove for outputting information selected and displayed on the display and voice information input through the microphone and for transmitting information received from the exterior to the display and the speaker; and a battery for supplying power to the wireless communication module and the display.

24 Claims, 10 Drawing Sheets

WEARABLE PHONE AND METHOD OF USING THE SAME

BACKGROUND OF THE INVENTION

This application claims priority from Korean Patent Application No. 2003-42774, filed on Jun. 27, 2003, in the Korean Intellectual Property Office, the disclosure of which is incorporated herein by reference in its entirety.

1. Field of the Invention

The present invention relates to a portable phone and a method of using the same, and more specifically, to a glove-shaped wearable phone and a method of using the same.

2. Description of the Related Art

Nowadays, with the generalized use of portable phones, more attention is being paid to a reduction in the volume of the portable phones and convenient methods of carrying the phones. Thus, various and modified methods of wearing phones have been proposed in more convenient manners.

For example, methods of using a necklace to wear a phone, using a pouch for the exclusive use of a phone, and putting a phone on a user's hip have been proposed.

Meanwhile, although portable phones embedded in watches or accessory-type phones attachable to clothes were also invented, they are not widely used.

In recent years, ring-type phones and glove-type phones, which focus on wearing and using convenience, have been invented. In both types of phones, the positions of speakers and microphones are determined considering distance between the mouth and the ear. In particular, since a ring-type phone is highly portable and transformable, it provides various combinations. Also, the ring-type phone enables ear-mouth distance equivalent to that in conventional folder-type portable phones.

Nevertheless, the ring-type phones have the following disadvantages.

Firstly, phones that are manufactured in the shape of rings are not customized to fit various users, and wearing and removing them are somewhat inconvenient.

Secondly, because of limited miniaturization techniques, it is difficult to prepare wireless communication modules and power suppliers for the ring-type phones. Instead, the wireless communication modules and the power suppliers need to be mounted on portions other than the phones, for example, the wrist or the like. Therefore, it would be quite inconvenient and uncomfortable.

Thirdly, it is difficult to transmit and receive data between the ring-type phone and a wireless communication module and also to supply electric power to the phone.

Fourthly, a speaker having good sound quality cannot be mounted on the ring-type phone because of its large size.

The latter phone, i.e., a glove-type phone, is wearable on one hand and its microphone 20 and speaker 18 are disposed considering distance between the ear and the mouth as shown in FIG. 1.

In the phone 10 shown in FIG. 1, a first key panel 48 including buttons is located on the back of the hand. Thus, whenever a user makes a phone call or selects a mode, the other hand, which does not wear the phone, is needed to select a button. That is, the phone shown in FIG. 1 lacks hands-free control, which is one of three requisites for wearable phones (i.e., carrying convenience, comfortable calling posture, and hands-free control).

Also, when the key panel 48 is installed in the limited space of the back of the hand, reducing the size of keys is limited due to the thicknesses of the fingers and this restricts the size of a display. Accordingly, the glove-type phone 10 shown in FIG. 1 does not meet the requisitions for the latest portable phones, such as large-sized displays for voice communications and the exchange and display of diverse multimedia information.

Also, technically, the phone 10 shown in FIG. 1 has an advantage of disposing the speaker 18 on the palm of the hand to help a user's comfortable calling. However, since the speaker 18 and a strap 66 used for supporting the speaker 18 are disposed on the palm required for touching and handling various objects, the speaker 18 may be mechanically and chemically shocked.

In FIG. 1, reference numerals 12, 14, 42, and 44 denote a glove, the hand, the wrist, and the fingers, respectively. Reference numerals 50, 52, and 54 denote a first display, a first antenna, and a battery receiving mechanism, respectively. Reference numerals 56, 58, 60, and 66 denote a battery, a circuit receiving mechanism, a card slot, and the first strap, respectively. Also, reference numerals 68, 70, and 92 denote a second strap, a supporting element, and the big finger, respectively.

A more detailed description of the phone 10 shown in FIG. 1 is disclosed in U.S. Pat. No. 6,044,153 entitled "HAND ADAPTIVE TELEPHONE" by Kevin D. Kaschke and Hoffman Estates.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems discussed above.

An apparatus consistent with the present invention provides a wearable phone, which is conveniently carried, easily worn on and removed from the hand, enables advanced hands-free control, prevents damage to elements while touching or handling various objects, maximizes the size of a display, and allows the palm and the fingers to normally have the sense of touch.

A method consistent with the present invention also provides a process of using the foregoing wearable phone.

According to an aspect of the present invention, there is provided a wearable phone comprising a glove. A display is mounted on the glove and includes a user interface, and a virtual key pad is displayed thereon. A sensor is disposed under the display, for sensing the movement of the entire hand. Sensors are disposed at interfaces between the fingers and the back of the hand, for sensing the movements of the fingers. A speaker is disposed under the root of the little finger, and a microphone is spaced apart from the speaker by a predetermined distance below the speaker. A wireless communication module is provided for outputting information selected and displayed on the display and voice information input through the microphone and for transmitting information received from the exterior to the display and the speaker. A battery supplies power to the wireless communication module and the display. Herein, all the elements excluding the glove are disposed at other portions than the palm of the glove.

Also, the fingers in the glove may be exposed.

The battery may be disposed at the wrist of the glove or at a portion between the display and the wireless communication module.

The phone may further include a sixth sensor disposed at an interface between the little finger and the back of the hand to sense the movement of the little finger.

The microphone may be disposed at the wrist of the glove.

The speaker may be embedded in the glove, and a plurality of holes may be disposed at a portion of the glove, in which the speaker is embedded, to expose portions of the speaker.

The microphone may be embedded in the glove, and a plurality of holes may be disposed at a portion of the glove, in which the microphone is embedded, to expose portions of the microphone.

The wireless communication module may include an embedded antenna or an external antenna.

The sensors for sensing the movements of the entire hand and the fingers may be inertial sensors such as gyrometers and accelerometers.

According to another aspect of the present invention, there is provided a method of using a wearable phone comprising a display for displaying a virtual key pad, a sensor for sensing the movement of the entire hand, sensors for sensing the movements of the fingers, a speaker, a microphone, a wireless communication module, and a battery. The method comprises (a) wearing the glove on the hand; (b) displaying on the display the virtual key pad including a plurality of virtual buttons; and (c) selecting one of the virtual buttons by moving the hand wearing the glove.

The process of selecting one of the virtual buttons may include (c1) selecting one of a plurality of rows including the virtual buttons by moving the entire hand; and (c2) selecting one of the virtual buttons from the selected row by moving the finger.

Alternatively, this selection process may include (c1) selecting one of a plurality of rows including the virtual buttons by moving the entire hand; and (c2) selecting a wanted virtual button from the selected row by rotating the entire hand. Herein, the method may further comprise (c3) selecting one of a plurality of characters included in the selected virtual button by moving the finger.

Operation (c2) may be followed by converting modes by moving the big finger.

While it is preferable that the virtual buttons are selected by moving the finger once, they may be selected by varying the number of movements of one finger instead.

While it is preferable that the plurality of characters included in the virtual button are selected by moving the finger once, they may be selected by varying the number of movements of one finger instead.

According to the present invention, it is easy to wear/remove a portable phone on/from the hand and it is unlikely to lose the phone. Also, the size of a display can be increased more than in conventional phones. Also, since no elements are mounted on the palm of the hand and the fingers, a user feels comfortable in the glove-shaped phone, and the palm and the fingers normally have the sense of touch. Further, advanced hands-free control is enabled.

BRIEF DESCRIPTION OF THE DRAWINGS

The features and advantages of the present invention will become more apparent by describing in detail exemplary embodiments thereof with reference to the attached drawings in which:

FIG. 2A shows the back of the left hand where the phone is mounted and FIG. 2B shows the palm of the left hand where the phone is mounted;

DETAILED DESCRIPTION OF ILLUSTRATIVE, NON-LIMITING EMBODIMENTS OF THE INVENTION

Figure 1:
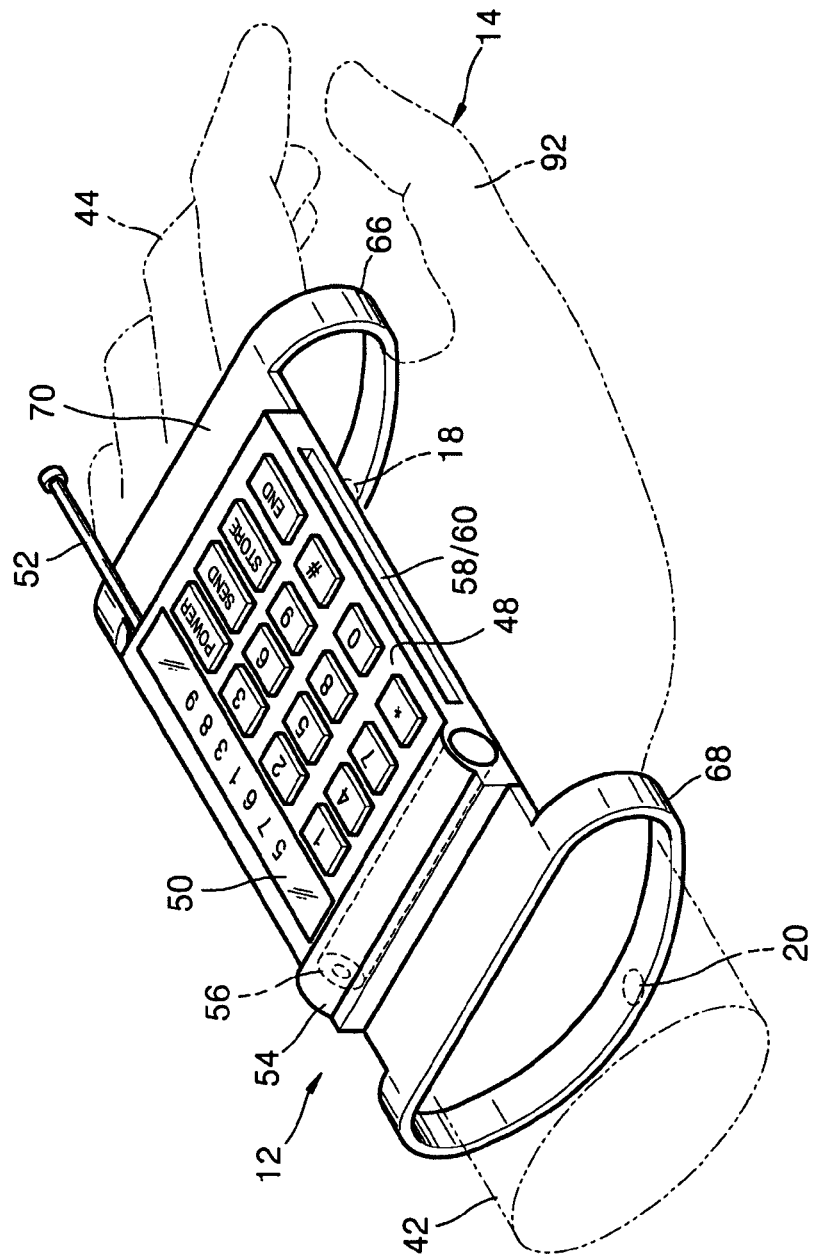
FIG. 1 is a perspective view of a conventional wearable phone.

The present invention will now be described more fully with reference to the accompanying drawings, in which an exemplary embodiment of the invention is shown. In the drawings, the thicknesses of layers or regions may be exaggerated for clarity.

Figure 2A:
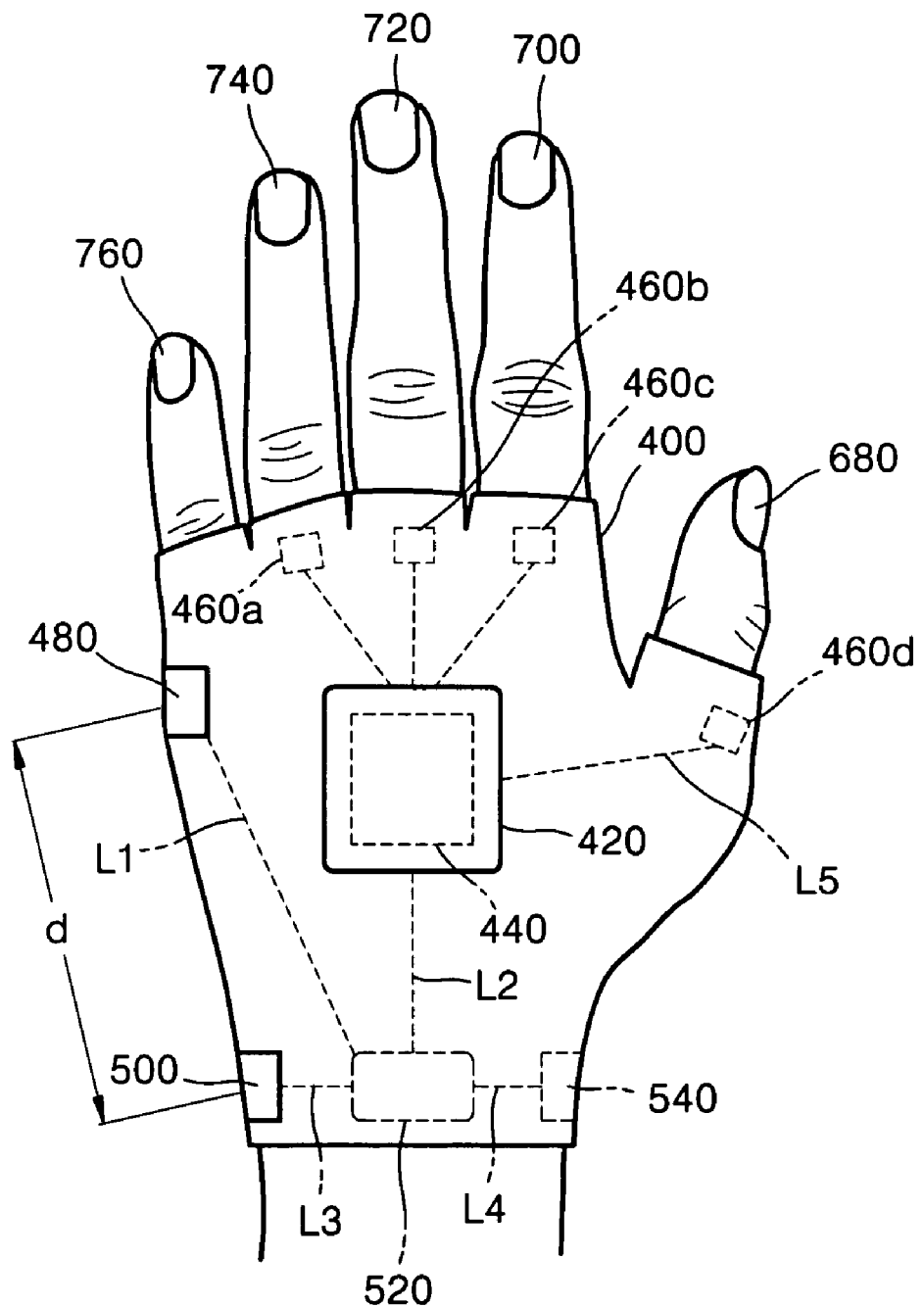
FIGS. 2A and 2B are plan views of a glove-shaped wearable phone according to an embodiment of the present invention, and herein
Figure 2B:
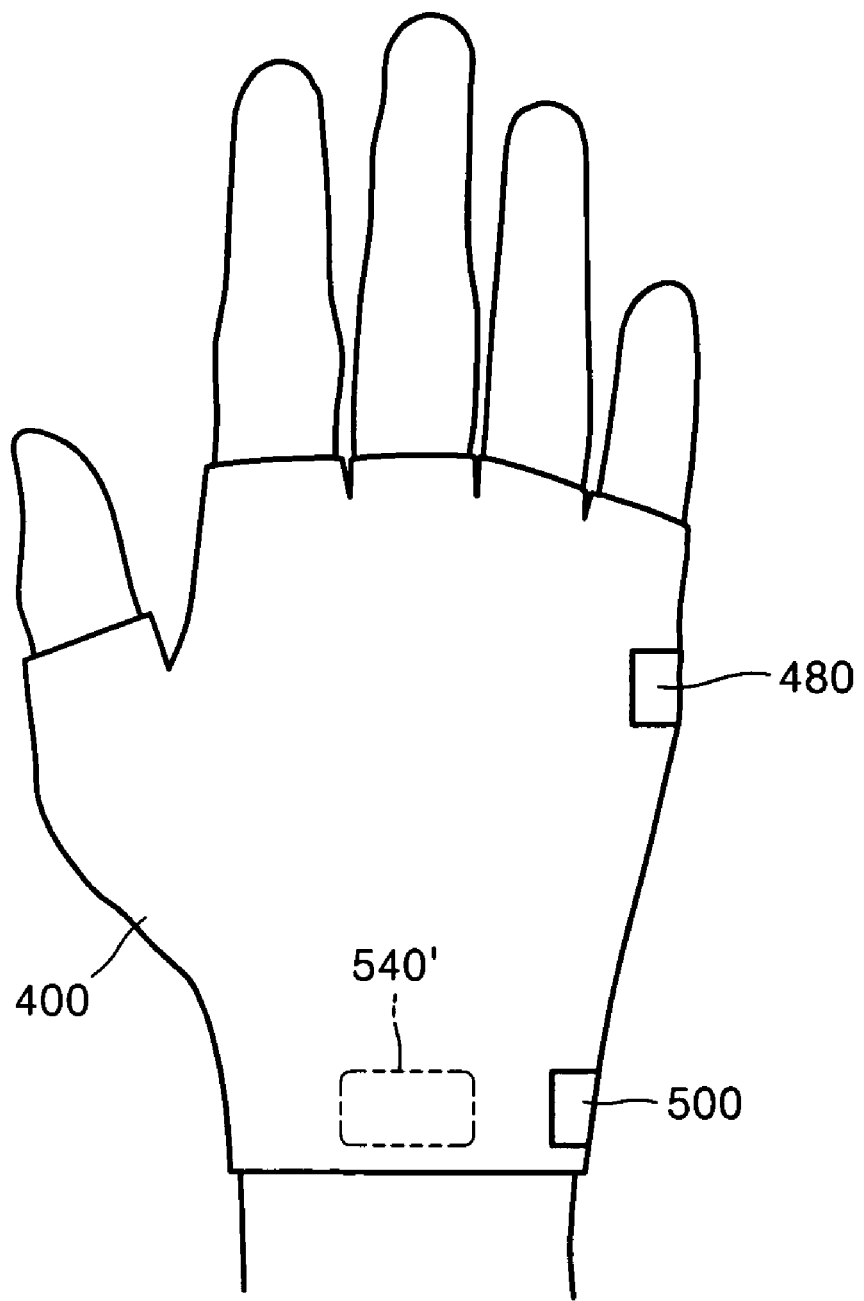

As shown in FIGS. 2A and 2B, a phone consistent with the present invention is installed in a glove 400 exposing the fingers. Herein, while all elements constituting the phone are disposed on the back of the hand and the wrist, no elements are disposed on the palm of the hand. Thus, when the phone of the present invention operates, the palm and the fingers can normally have the sense of touch. Also, since the movements of the fingers are free, a user can touch or handle objects freely while wearing the glove 400.

Specifically, referring to FIG. 2A, a display 420 where a user interface is embedded is disposed in the center of a portion of the glove 400 covering the back of the hand. A virtual key pad is displayed on the display 420. The virtual key pad displayed on the display 420 is controlled by the movements of the hand and fingers. The control of the virtual key pad will be described in detail later. A first sensor 440 is disposed under the display 420. The first sensor 440 is embedded in the glove 440 under the display 420. Thus, the first sensor 440 is not exposed inside or outside the glove 400. The first sensor 440 (e.g., an inertial sensor) senses the vertical and horizontal movements and rotations of the hand. Second through fifth sensors 460a, 460b, 460c, and 460d are embedded in portions of the glove 400 covering joints adjacent to the roots of the fingers. The second through fifth sensors 460a, 460b, 460c, and 460d (e.g., gyrometers or accelerometers) are used to sense the movements of the fingers. The second through fifth sensors 460a, 460b, 460c, and 460d are used to sense the vertical movements of the ring finger, middle finger, index finger, and big finger, respectively. The second through fifth sensors 460a, 460b, 460c, and 460d are connected to the display 420 through a fifth interconnection L5 embedded in the glove 400. A speaker 480 is disposed on the left side of the first sensor 420

(if the glove 400 is worn by the right hand, the speaker 480 is disposed on the right side of the first sensor 420 instead). The speaker 480 is disposed at a connection portion between the palm and the back of the hand below the root of the little finger 760.

Meanwhile, when a user tries to move the hand toward the ear to answer the phone, the most comfortable motion comprises putting the palm on the ear and then putting the connection portion between the palm and the back of the hand below the root of the little finger 760 on the ear. The two movements are completed by simply putting the forearm up without twisting the arm or the wrist and thus even easier than other movements.

Accordingly, if considering only a process of answering the phone, it is preferable that the speaker 480 is mounted on the palm of the hand. However, in this case, the user cannot touch or handle objects freely as indicated in the Background of the Invention. Therefore, when a glove-shaped portable phone is manufactured, mounting a speaker at the connection portion between the palm and the back of the hand below the root of the little finger is most preferable.

For this reason, in the phone of the present invention, the speaker 480 is disposed at the connection portion between the palm and the back of the hand below the root of the little finger 760. Here, while the speaker 480 is preferably mounted the outside the glove 400, it is possible to embed the speaker 480 in the glove 400. In this case, a plurality of holes are preferably formed at a portion of the glove 400, in which the speaker 480 is embedded, so as to expose portions of the speaker 480.

Although the speaker 480 is preferably disposed at the connection portion between the palm and the back of the hand below the root of the little finger 760, it is possible to dispose the speaker 480 on the opposite side, i.e., at a portion between the index finger 700 and the big finger 680 instead.

A wireless communication module 520 and a microphone 500 are disposed at a portion of the glove 400 covering the wrist. The wireless communication module 520 transmits to the exterior voice information input to the microphone 500 and character information, which is selected by the movements of the hand and fingers and displayed on the display 420. Also, when a camera is included in the glove 400, the wireless communication module 520 can transmit a picture taken by the camera to the exterior. Also, the wireless communication module 520 receives voice information from the exterior to transmit to the speaker 480 and receives character information and picture information to display them on the display 420. This wireless communication module 520 is preferably embedded in a portion of the glove 400 covering the outside of the wrist. The wireless communication module 520 is connected to the speaker 480, the display 420, and the microphone 500 through first through third interconnections L1, L2, and L3, respectively. The microphone 500 is preferably disposed in the same direction as the speaker 480. Like the speaker 480, the microphone 500 may be embedded in the glove 400. In this case, a plurality of holes may be formed at a portion of the glove 400, in which the microphone 500 is embedded, so as to expose portions of the microphone 500. The speaker 480 is preferably spaced apart from the microphone 500 by a predetermined distance corresponding to the distance between the mouth and the ear, for example, about 10 cm. The microphone 500 may protrude out of the glove 400 by a predetermined length.

Meanwhile, in addition to the microphone 500 and the wireless communication module 520, a battery 540 may be disposed at the portion of the glove 400 covering the wrist. The battery 540 is connected to the wireless communication module 520 through a fourth interconnection L4. The battery 540 may be disposed at some other portion. For example, the battery 540 may be disposed at a portion between the display 420 and the wireless communication module 420 or under the wireless communication module 420. Alternatively, as shown in FIG. 2B, a battery 540' may be positioned at a portion of the glove 400 covering the inside of the wrist. The battery 540 supplies electric power to the wireless communication module 520, the display 420, and the like.

An antenna, which is required to transmit and receive the foregoing information, is preferably embedded in the wireless communication module 520. However, it is possible that the antenna be disposed at the wireless communication module 520 but protrude out of the glove 400. In this case, the antenna preferably has a flexible length.

Hereinafter, a process of selecting the numbers from the virtual key pad displayed on the display 420 in the portable phone of the present invention will be described. Here, the display 420 is separately illustrated to clarify the contents displayed on the display 420.

Initially, a process of selecting a row including a wanted number will be described with reference to FIGS. 3 through 5.

Figure 3:
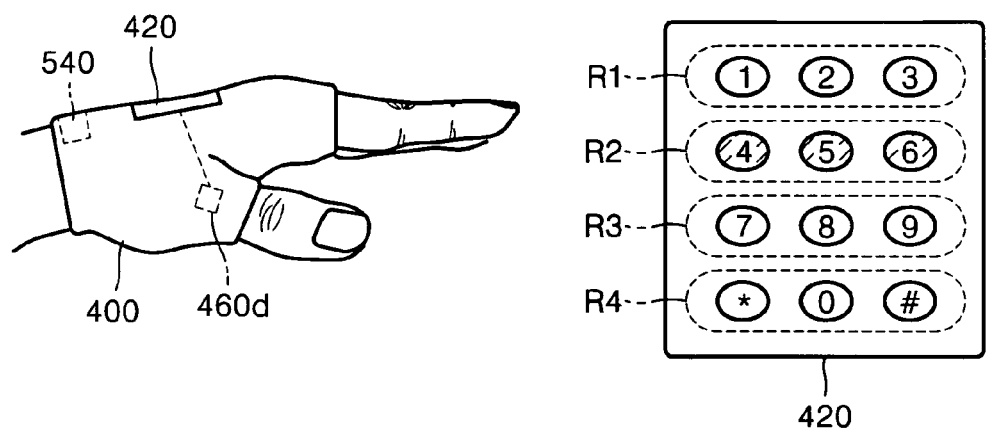
FIGS. 3 through 8 are diagrams showing correlations between the movements of the fingers of the hand where the phone shown in FIGS. 2A and 2B is mounted and the numbers selected according thereto in a number input mode.

Referring to FIG. 3, the glove 400 including a phone of the present invention is worn on the left hand. Next, the big finger 680 moves to display on the display 420 the virtual key pad including numbers 0~9 and special characters such as an asterisk * and a sharp #. In the virtual key pad, the arrangement of the numbers and special characters is the same as in conventional portable phones. That is, in the virtual key pad displayed on the display 420, numbers 1, 2, and 3 are in a first row R1, numbers 4, 5, and 6 are in a second row R2, and numbers 7, 8, and 9 are in a third row R3. Also, a number 0 and the special characters * and # are in a fourth row R4.

After the virtual key pad including the numbers and special characters is displayed on the display 420, if the hand is made to be level with the ground, the second row R2 is selected.

Figure 4:
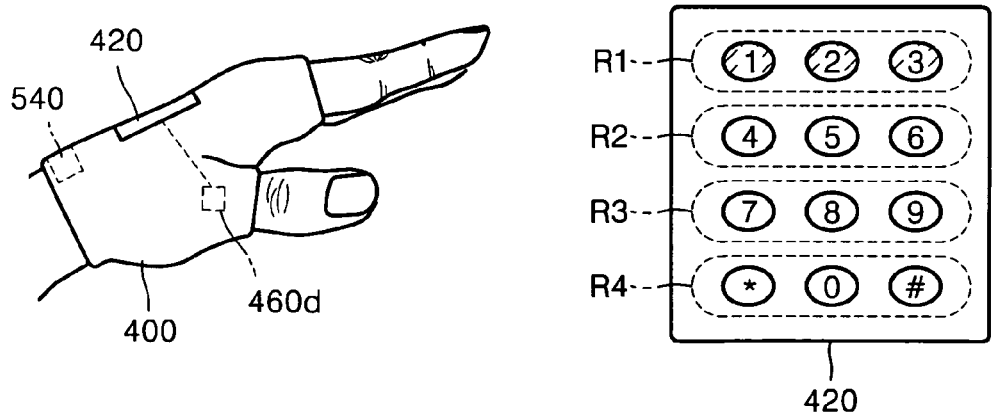
Figure 5:
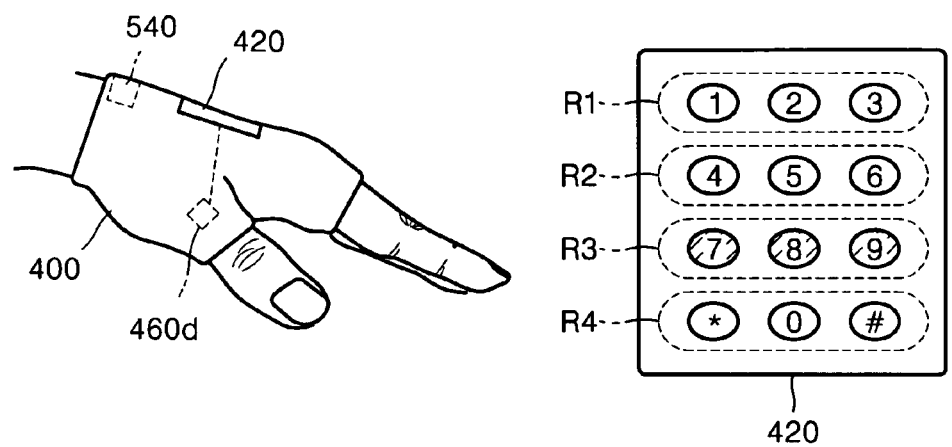

If the hand moves upward as shown in FIG. 4, the first sensor (440 of FIG. 2), which is embedded in the glove 400 under the display 420, senses this movement of the hand, thereby selecting the first row R1. Also, if the hand moves downward as shown in FIG. 5, the third row R3 is selected. Here, if the hand moves further downward, the fourth row R4 is selected.

After the row including a wanted number is selected by moving the hand upward or downward, the wanted number in the selected row is selected by moving the index finger 700, the middle finger 720, or the ring finger 740.

Figure 6:
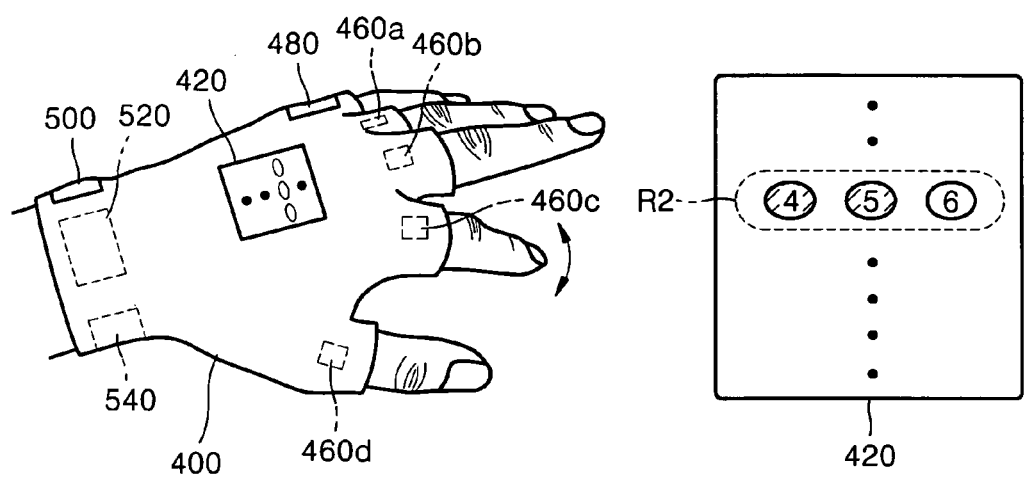

For example, after the second row R2 is selected by making the hand level with the ground as shown in FIG. 3, the index finger 700 moves as shown in FIG. 6. This movement of the index finger 700 is sensed by the fourth sensor 460c, which undertakes the movements of the index finger 700. In a state where the second row R2 is selected, the index finger 700 corresponds to the number "6" among the numbers 4, 5, and 6 included in the second row R2. Accordingly, the number "6" is selected by the movement of the index finger 700.

Figure 7:
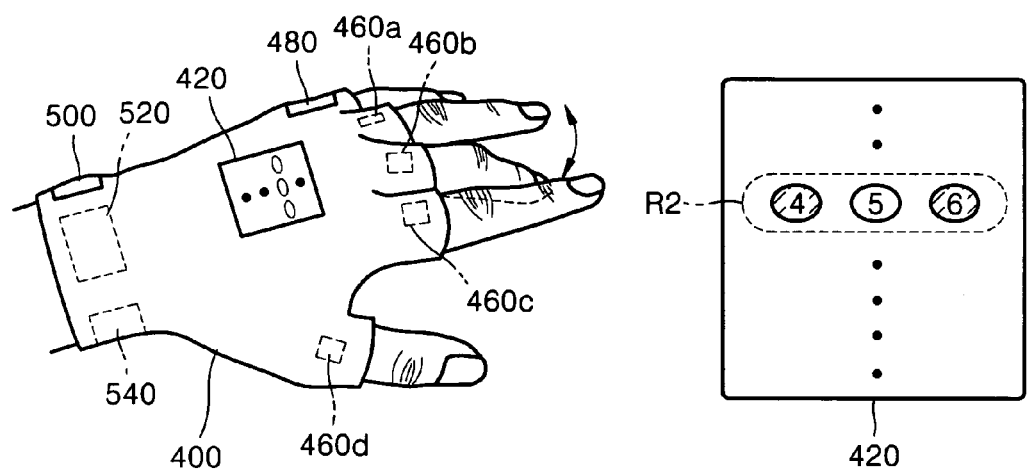

Also, after the second row R2 is selected, if the middle finger 720 moves as shown in FIG. 7, this movement of the middle finger 720 is sensed by the third sensor 460b, which undertakes the movements of the middle finger 720. Thus, the number "5" corresponding to the middle finger 720 is selected from the second row R2.

Figure 8:
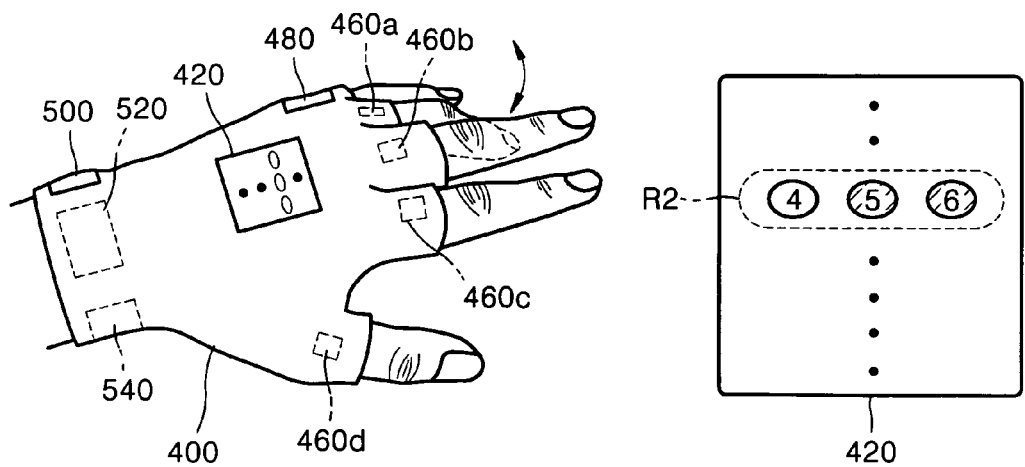

Also, after the second row R2 is selected, if the ring finger 740 moves as shown in FIG. 8, this movement of the ring finger 740 is sensed by the second sensor 460a, which undertakes the movements of the ring finger 740. Thus, the number "4" corresponding to the ring finger 740 is selected from the second row R2.

Also, when virtual buttons are selected, it is possible to use only one finger instead of all the fingers. In this case, the number of movements of the finger may vary according to the wanted numbers or characters.

The big finger 680 is used to convert operating modes of the phone. For example, by moving the big finger 680, the phone can be converted from a number input mode to a character input mode.

Figure 9:
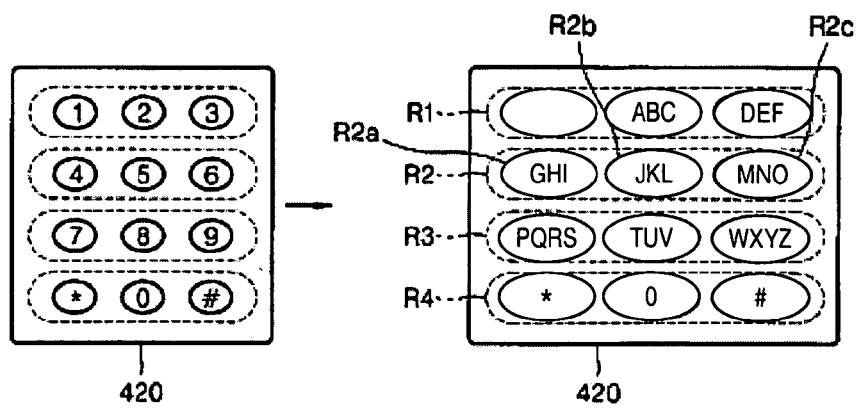
FIG. 9 is a diagram showing a process of converting the phone shown in FIGS. 2A and 2B from in the number input mode to in a character input mode by the movement of the big finger.

FIG. 9 shows changed constructions of the virtual key pad displayed on the display 420 when the phone is converted from the number input mode to the character input mode.

Referring to FIG. 9, as the number input mode is converted to the character input mode, the virtual key pad displayed on the display 420 has different constructions in the first through fourth rows R1, R2, R3, and R4.

In other words, in the character input mode, each of the first through fourth rows R1, R2, R3, and R4 includes three virtual buttons, and each virtual button includes three characters.

Thus, to input a wanted character in the character input mode, a virtual button including the character is first selected and then the character included in the selected virtual button is selected. Likewise, only one finger may be used and the number of the movements of the finger may vary according to the wanted characters.

The character input mode will be described in more detail with reference to FIGS. 10 through 12.

Figure 10:
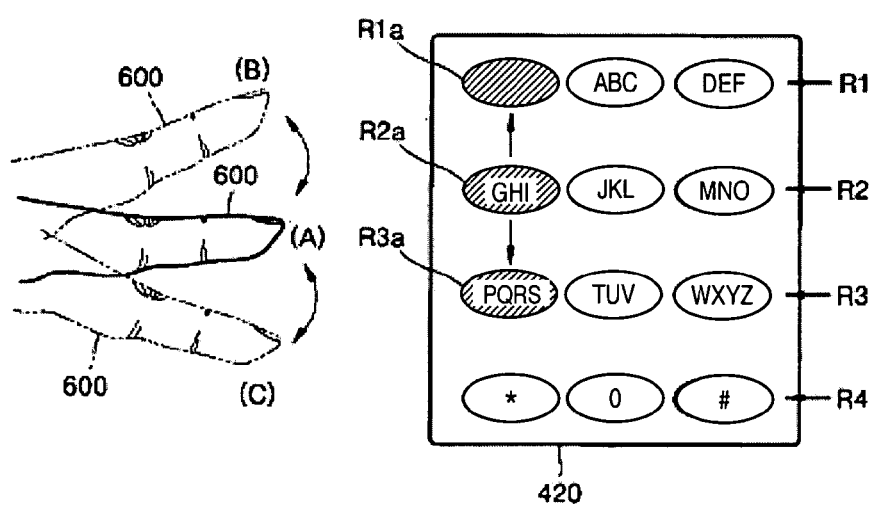
FIG. 10 is a diagram showing correlations between the vertical movements of the hand where the phone shown in FIGS. 2A and 2B is mounted and the character groups selected according thereto in the character input mode.

In FIG. 10, reference numeral 600 symbolically denotes the hand wearing the glove including the phone of the present invention. Reference characters A, B, and C each denote the position of the hand 600. That is, when the hand 600 is in a first position A, the hand 600 is level with the ground. When the hand 600 is in a second position B, the hand 600 is faced upward from a level. Also, when the hand 600 is in a third position C, the hand 600 is faced downward from the level.

Referring to FIG. 10, when the hand 600 is in the first position A, a first virtual button R2a in the second row R2 is selected among virtual buttons displayed on the display 420. When the hand 600 is in the second position B, a first virtual button R1a in the first row R1, which is positioned right above the first virtual button R2a in the second row R2, is selected. Also, when the hand 600 is in the third position C, a first virtual button R3a in the third row R3, which is positioned right below the first virtual button R2a in the second row R2, is selected.

In this character input mode, according to the movement of the hand 600, one of virtual buttons in one row is selected instead of selecting the one row. Also, one of virtual buttons in the same column is selected by the vertical movements of the hand 600.

In the number input mode, the number of numbers is not so many that the numbers can respectively correspond to virtual buttons of one virtual key pad. For example, in a key pad including four rows and three columns, since three fingers can correspond to one row, movements between columns are unnecessary. On the other hand, in the character input mode, the number of characters is so many that a plurality of characters, the number of which is limited to the number of fingers, should correspond to one key pad, and movements between columns are needed to select keys.

Hereinafter, a method of selecting one of the virtual buttons in a row in the character input mode will be described.

Figure 11:
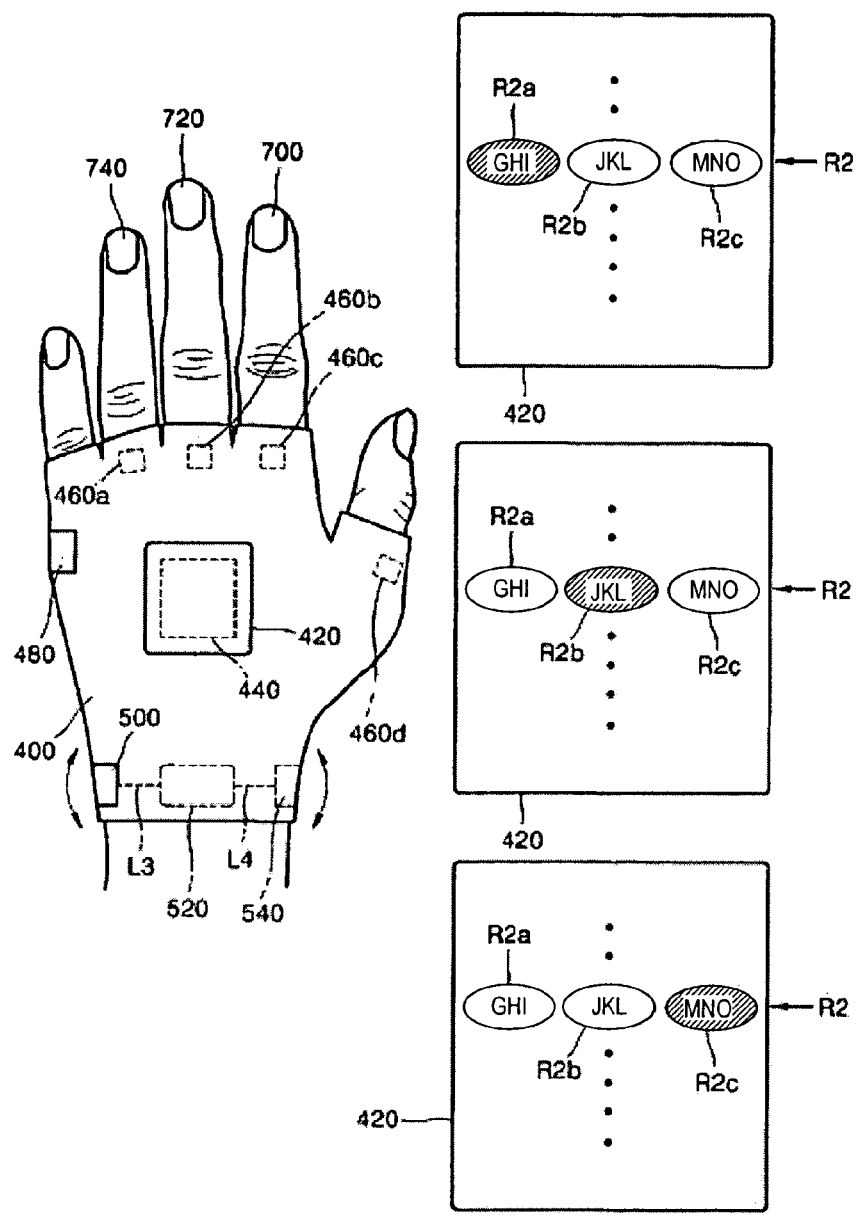
FIG. 11 is a diagram showing correlations between the horizontal movements or rotations of the hand where the phone shown in FIGS. 2A and 2B is mounted and the character groups selected according thereto in the character input mode.

Referring to FIG. 11, conventional alpha-numeric English characters are denoted on the virtual buttons. Of course, however, other non-English characters (e.g., Korean or Japanese characters) can be provided on the virtual buttons. When the hand wearing the glove 400 moves or rotates to the left, the first virtual button R2a in the second row R2, where characters G, H, and I are written, is selected. When the hand is made to be level with the ground, a second virtual button R2b in the second row R2, where characters J, K, and L are written, is selected. Also, when the hand moves or rotates to the right on the level, a third virtual button R2c in the second row R2, where characters M, N, and O are written, is selected.

Next, a method of selecting one of the characters written on the selected button will be described. Assume here for clarity that the selected virtual button is the first virtual button R2a in the second row R2. The following description can be applied likewise to selection of characters included in the other virtual buttons.

Figure 12A:
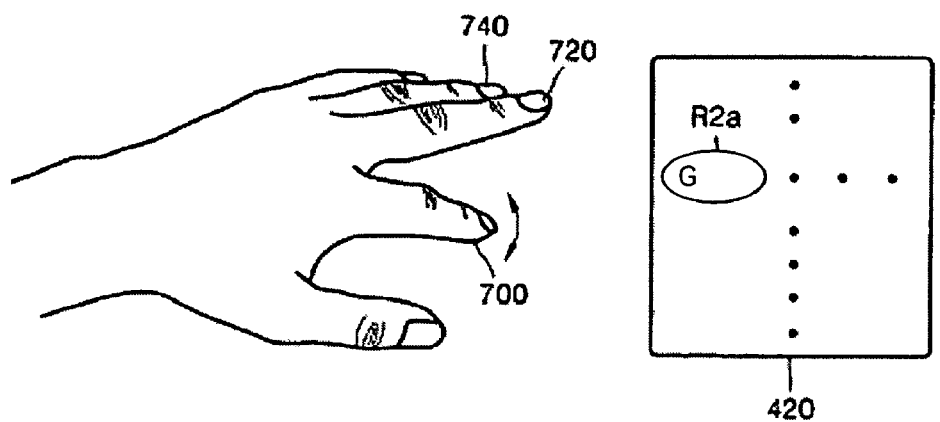
FIGS. 12A through 12C are diagrams showing processes of selecting characters from the character groups selected according to the movements of the fingers of the hand where the phone shown in FIGS. 2A and 2B is mounted.

Referring to FIG. 12A, the index finger 700, the middle finger 720, and the ring finger 740 of the hand correspond to the characters G, H, and I written on the first virtual button R2a, respectively. Thus, if the index finger 700 moves as shown in FIG. 12A, this movement of the index finger 700 is sensed by the fourth sensor 460c to select the character I from the first virtual button R2a.

Figure 12B:
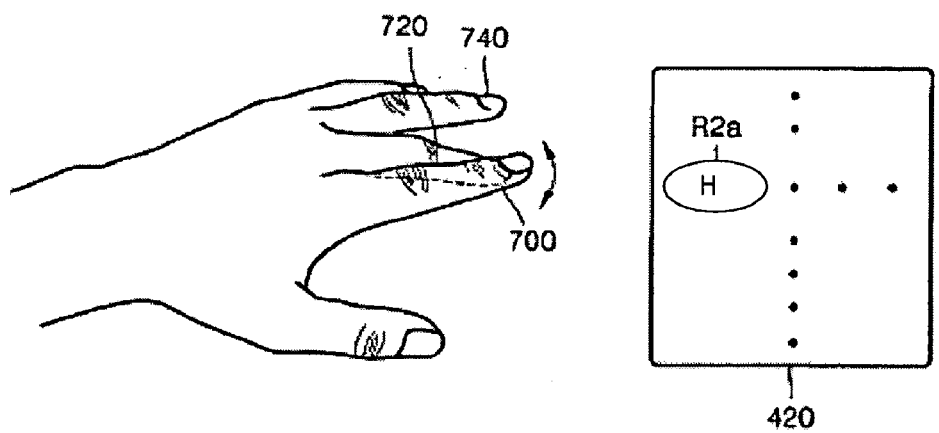

If the middle finger 720 moves as shown in FIG. 12B, this movement of the middle finger 720 is sensed by the third sensor 460b. Thus, the character H is selected from the first virtual button R2a.

Figure 12C:
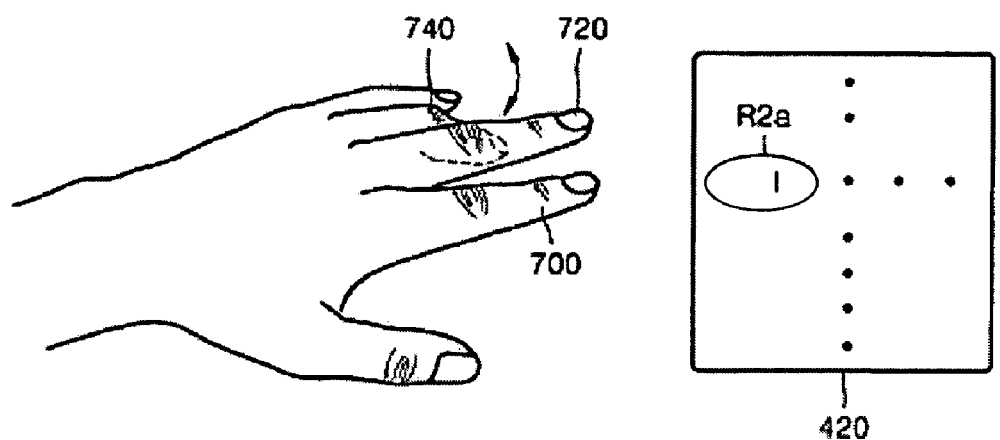

Also, if the ring finger 740 moves as shown in FIG. 12C, this movement of the ring finger 740 is sensed by the second sensor 460a. Thus, the character G is selected from the first virtual button R2a.

According to the foregoing methods, the other virtual buttons displayed on the display 420 can be selected, and other characters can be selected from the selected virtual button.

Meanwhile, one, two, three, or four different characters can be included in one virtual button displayed on the display 420. If one virtual button includes four different characters, a fourth character may correspond to the little finger 760 such that the fourth character is selected by the movement of the little finger 760. For this, an additional movement sensor for sensing the movement of the little finger 760 may be further mounted adjacent to the root of the little finger 760.

In the character input mode, the virtual buttons may include not only the Korean alphabet and English alphabet but also widely used various characters, marks (e.g., an arrow → showing a direction), and/or signs. Also, the virtual button may include one kind of characters or two or more kinds of characters. For example, the English characters G, H, I included in the first virtual button R2a in the second row R2 may be replaced by both English characters and Korean characters ㅊ, ㅋ, and ㅌ. Essentially, any combination of characters, numbers and/or signs may be included in each virtual button, depending on the user's needs.

Meanwhile, the phone of the present invention can select other functions, such as the Internet and games, by converting modes using the big finger 680. After a new mode is selected, function keys used in the new mode can be selected by the vertical and horizontal movements of the hand and the movements of the index finger 700, the middle finger 720, and the ring finger 740, in the same manner as in the character input mode.

As described above, in the present invention, all the elements constituting a portable phone are disposed at a portion of a glove covering the back of the hand. Accordingly, it is easy to wear/remove the phone on/from the hand and to carry the phone and it is unlikely to lose the phone. Also, with the use of a virtual key pad, a display can take up a larger area than in conventional phones and is thus significantly useful in displaying multimedia information including character information. Also, since no elements are mounted on the palm of the hand and the fingers, a user feels comfortable in the glove-shaped phone and the palm and the fingers normally have the sense of touch. Further, by displaying a virtual key pad on the display, all functions can be used only by the movements of the fingers without holding any element. As a result, advanced hands-free control is embodied.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, those of ordinary skill in the art can use the little finger 760 to convert modes and use the big finger 680 to select keys for utilizing the mode selected by the little finger 760, and mount a movement sensor on the glove 400. Also, the glove 400 may be formed of a flexible plastic in place of ordinary fabrics or leathers. Also, instead of selecting a virtual button only by the movement of a certain finger, the virtual button may be selected by moving all the fingers at the same time. For example, when the index finger, the middle finger, and the ring finger move at the same time in the same direction or when the index finger, the middle finger, the ring finger, and the little finger move at the same time in the same direction, a virtual button may be selected. Also, if even a typical glove includes no elements on the palm, is convenient for catching or handling objects, and allows the palm and the fingers to normally have the sense of touch, the phone of the present invention can be mounted on the glove. Also, if necessary, the elements may be installed on the palm of the gloves.

What is claimed is:

1. A wearable phone comprising:
   a glove;
   a display mounted on the glove and including a user interface, wherein a virtual key pad is displayed on the display;
   a sensor disposed under the display and mounted on the glove, the sensor for sensing the movement of a hand;
   finger sensors mounted on the glove and so as to be disposed at interfaces between fingers and a back of the hand, the finger sensors for sensing the movements of the fingers;
   a speaker mounted on the glove so as to be disposed under a root of a little finger;
   a microphone spaced apart from the speaker by a predetermined distance below the speaker;
   a wireless communication module mounted on the glove for outputting information selected and displayed on the display and voice information input through the microphone and for transmitting information received from an exterior to the display and the speaker; and
   a battery mounted on the glove for supplying power to the wireless communication module and the display,
   wherein all the elements excluding the glove are disposed at other portions than a palm of the glove.

2. The phone of claim 1, wherein the glove has a shape in which the fingers are exposed when the glove is worn.

3. The phone of claim 1, wherein the finger sensors for sensing the movements of the fingers are a second sensor, a third sensor, a fourth sensor, and a fifth sensor for sensing the movements of the ring finger, the middle finger, the index finger, and the big finger, respectively.

4. The phone of claim 3, further comprising a sixth sensor disposed at an interface between the little finger and the back of the hand, the sixth sensor for sensing the movement of the little finger.

5. The phone of claim 1, wherein the microphone is disposed at a wrist portion of the glove.

6. The phone of claim 1, wherein the battery is disposed at the wrist portion of the glove or at a portion between the display and the wireless communication module.

7. The phone of claim 1, wherein the speaker is embedded in the glove.

8. The phone of claim 7, wherein a plurality of holes are disposed at a portion of the glove, in which the speaker is embedded, to expose portions of the speaker.

9. The phone of claim 1 or 5, wherein the microphone is embedded in the glove.

10. The phone of claim 9, wherein a plurality of holes are disposed at a portion of the glove, in which the microphone is embedded, to expose portions of the microphone.

11. The phone of claim 6, wherein the battery is disposed at an inside portion of the wrist portion of the glove.

12. The phone of claim 1, wherein the wireless communication module includes one of an embedded antenna and an external antenna.

13. The phone of claim 1, wherein the sensor for sensing the movement of the hand is an inertial sensor.

14. The phone of claim 1, wherein the finger sensors for sensing the movements of the fingers are inertial sensors such as gyrometers and accelerometers.

15. A method of using a wearable phone comprising a glove, a display for displaying a virtual key pad mounted on the glove, a sensor mounted on the glove for sensing the movement of an entire hand, finger sensors mounted on the glove for sensing the movements of fingers, a speaker, a microphone, a wireless communication module mounted on the glove, and a battery mounted on the glove, the method comprising:
   (a) wearing the glove on the hand;
   (b) displaying on the display mounted on the glove, the virtual key pad including a plurality of virtual buttons; and
   (c) selecting one of the virtual buttons displayed on the display by moving the hand wearing the glove.

16. The method of claim 15, wherein operation (c) comprises:
   (c1) selecting one of a plurality of rows including the virtual buttons by moving the entire hand; and
   (c2) selecting one of the virtual buttons from the selected row by moving one of the fingers.

17. The method of claim 15, wherein operation (c) comprises:
   (c1) selecting one of a plurality of rows including the virtual buttons by moving the entire hand; and
   (c2) selecting a wanted virtual button from the selected row by rotating the entire hand.

18. The method of claim 17, further comprising (c3) selecting one of a plurality of characters included in the selected virtual button by moving one of the fingers.

19. The method of claim 16, wherein operation (c2) is followed by converting modes by moving a big finger.

20. The method of claim 16, wherein the virtual buttons are selected by moving one of the fingers once.

21. The method of claim 16, wherein the virtual buttons are selected by varying the number of movements of one of the fingers.

22. The method of claim 18, wherein the plurality of characters included in the virtual button are selected by moving one of the fingers once.

23. The method of claim 18, wherein the plurality of characters included in the virtual button are selected by varying the number of movements of one of the fingers.

24. The method of claim 17, wherein operation (c2) is followed by converting modes by moving a big finger.

* * * * *